(12) United States Patent
Shirley et al.

(10) Patent No.: US 8,711,145 B2
(45) Date of Patent: Apr. 29, 2014

(54) REPRESENTING POLARIZED LIGHT IN COMPUTER MODELS

(75) Inventors: Peter Schuyler Shirley, Salt Lake City, UT (US); Solomon Boulos, Salt Lake City, UT (US); Jared Moroni Johnson, Riverton, UT (US); Austin Huff Robison, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 487 days.

(21) Appl. No.: 12/526,019

(22) PCT Filed: Feb. 7, 2008

(86) PCT No.: PCT/US2008/053317
§ 371 (c)(1),
(2), (4) Date: Nov. 16, 2010

(87) PCT Pub. No.: WO2008/098127
PCT Pub. Date: Aug. 14, 2008

(65) Prior Publication Data
US 2011/0043516 A1 Feb. 24, 2011

Related U.S. Application Data

(60) Provisional application No. 60/888,718, filed on Feb. 7, 2007.

(51) Int. Cl.
*G06T 15/50* (2011.01)
*G06T 15/60* (2006.01)
(52) U.S. Cl.
USPC ......................................................... 345/426
(58) Field of Classification Search
None
See application file for complete search history.

(56) References Cited

U.S. PATENT DOCUMENTS 6,674,430 B1 1/2004 Kaufman
8,115,763 B2 * 2/2012 Woop et al. .................... 345/420

OTHER PUBLICATIONS

Lawrence B. Wolff and David J. Kurlander, Ray Tracing with Polarization Parameters, IEEE Computer Graphics and Applications, 10, 6 (Nov. 1999), pp. 44-55.*
Morley et al., "Image Synthesis Using Adjoint Photons", ACM International Conference Proceeding Series; vol. 137 Proceeding of Graphics Interface 2006. pp. 179-186, entire document, especially Fig 2, pp. 180, 181, 185.
Jensen et al., "A Practical Model for Subsurface Light Transport", ACM SIGGRAPH 2001, Aug. 12-17, 2001, pp. 511-518.

* cited by examiner

*Primary Examiner* — Kee M Tung
*Assistant Examiner* — Haixia Du
(74) *Attorney, Agent, or Firm* — Workman Nydegger (57) ABSTRACT

The present invention extends to methods, systems, and computer program products for representing polarized light in computer models. A rendering pipeline receives three dimensional modeling data (e.g., geometric primitives) for rendering a two dimensional image are received. The modeling data includes data representing a light source The light energy from the simulated transmission of particles at each pixel of the two dimensional image is calculated for any particles transmitted in an adjoint direction from a specified view point back to the light source. The light energies from each pixel are summed to calculate the total light energy present at the specified view point. The total light energy can be forwarded to other modules in rendering pipeline to more accurately render the two dimensional image, such as, for example, representing polarized light in the two dimensional image.

19 Claims, 5 Drawing Sheets

FIG. 6
*Modeling Without Polarization
(Prior Art)*

REPRESENTING POLARIZED LIGHT IN COMPUTER MODELS

CROSS-REFERENCE TO RELATED APPLICATIONS

This application claims the benefit of U.S. Provisional Application No. 60/888,718, entitled "Representing Polarized Light In Computer Models", filed on Feb. 7, 2007, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One environment where computers have been used extensively to automate previously manually performed tasks is design and modeling. For example, there are many graphic design and modeling applications that can be used to, render images, model heat transfer, design lighting, and design other optical environments. More specifically to the field of image rendering, many of these applications include at least some ability to simulate various conditions to determine if a set of inputs provides an acceptable output. For example, intersection design applications can simulate light output from an arrangement of street lights to determine if the arrangement adequately lights the intersection, if the arrangement causes drivers from a particular approach to the intersection difficulty in observing the intersection, etc. Similarly, cockpit simulators can be used to simulate the view from an airplane cockpit under various different weather conations to determine if a pilot can properly operate the airplane under those various different weather conditions.

Image rendering and modeling applications typically rely on light transport algorithms to produce images (i.e., rectangular arrays of color values). Generally, light transport algorithms simulate the emission and scattering of light in artificial environments. That is, light transport algorithms can be used to essentially simulate real world physics in order to generate images with increased realism.

Predictive techniques (e.g., Monte Carlo techniques) are one common set of techniques for modeling light transport. Predictive techniques are based on sampling, where a scene model is accessed through a small set of queries (e.g., what is the first surface point intersected by a given ray?). Sampling hides scene complexity behind a layer of abstraction resulting in a loose coupling between rendering times and scene representation. In effect, predictive techniques sample scenes to determine the information they actually need for rendering and then predict what a scene will look like based on the samples taken from the scene.

More deterministic techniques examine more detail (and potentially every detail) from a scene. However, deterministic techniques have various processing constraints and are limited in application. On the other hand, predictive techniques have more general applicability and can be used to model a wider range of environments. Predictive techniques are also typically faster than more deterministic approaches that, as opposed to sampling, may examine every detail of a scene.

Thus, a variety of applications generate predictive computer generated images, where the image is physically accurate. Such images are used in applications for engineering design, architecture, and highway lighting design. For unpolarized light, there are number of techniques for creating such predictive images.

However, most predictive techniques assume a "corpuscular model" of light, where there are no wave effects such as polarization. In some environments, rendering without the effects of polarization may be sufficient. However, in other environments (e.g., safety critical environments), rendering without polarization results in image inaccuracies that may not acceptable. For example, failing to consider the effects of polarization when rendering an image for an airplane cockpit simulation or roadway intersection simulation can cause potentially dangerous situations to be overlooked.

Figure 6:
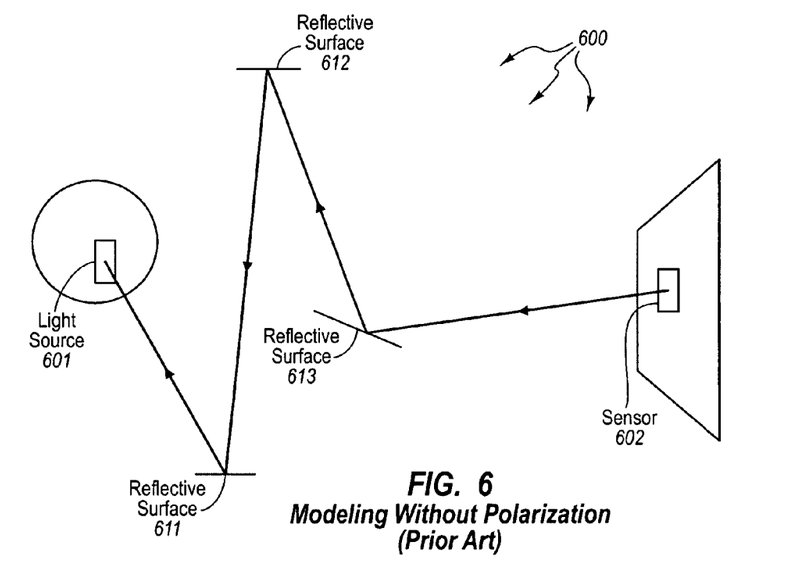
FIG. 6 illustrates an example of light traveling form a light source to a sensor without polarization.

Many modeling techniques that do not consider polarization, trace random photons back from the eye (the point of perception) to the light source. Tracing back takes advantage of a "self-adjoint" property of light: throughput is the same in either direction. For example, referring to FIG. 6, none the reflective surfaces are considered to polarize incident light. Thus, in FIG. 6, it may be that photons are emitted with energy E from light source 601, are reflected by intervening reflective surfaces 611, 612, and 613, and have energy kE when they arrive at 602 sensor. Accordingly, using the adjoint property it can be shown that if light was emitted with energy E from the sensor, then light having kE energy would reach the square of light. For various practical reasons, tracing light in the adjoint direction is often used in image rendering.

Polarization is the property of electromagnetic waves, such as light, that describes the direction of their transverse electric field. More generally, the polarization of a transverse wave describes the direction of oscillation in the plane perpendicular to the direction of travel. The simplest manifestation of polarization to visualize is that of a plane wave. A plane wave is a good approximation to most light waves (a plane wave is a wave with infinitely long and wide wave fronts). Electromagnetic waves propagating in free space or in a uniform material of infinite extent have electric and magnetic fields perpendicular to the direction of propagation. Conventionally, when considering polarization, the electric field vector is described and the magnetic field is ignored since it is perpendicular to the electric field and proportional to it.

Figure 2:
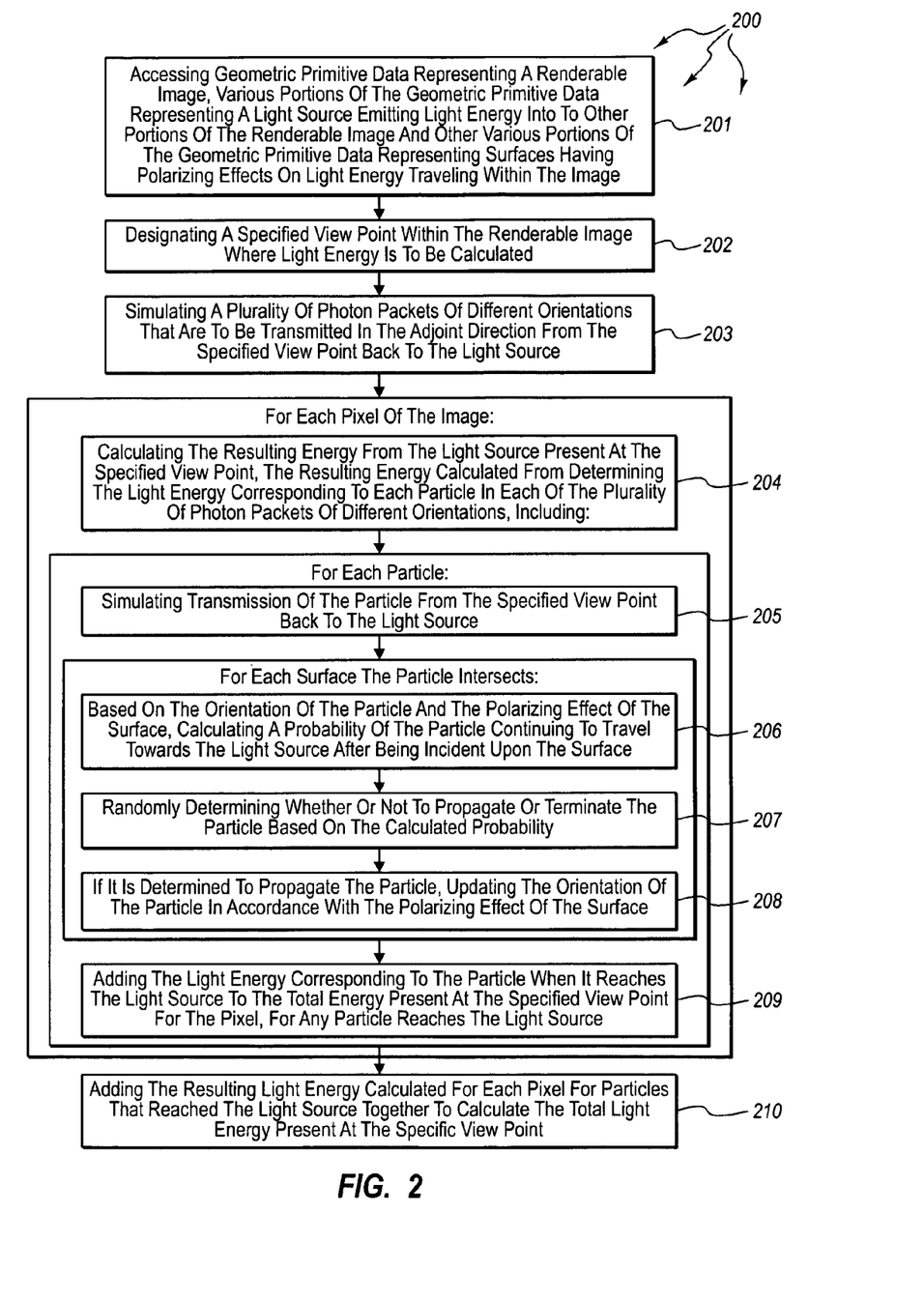
FIG. 2 illustrates a flow chart of an example method for representing polarized light in computer models.
Figure 7:
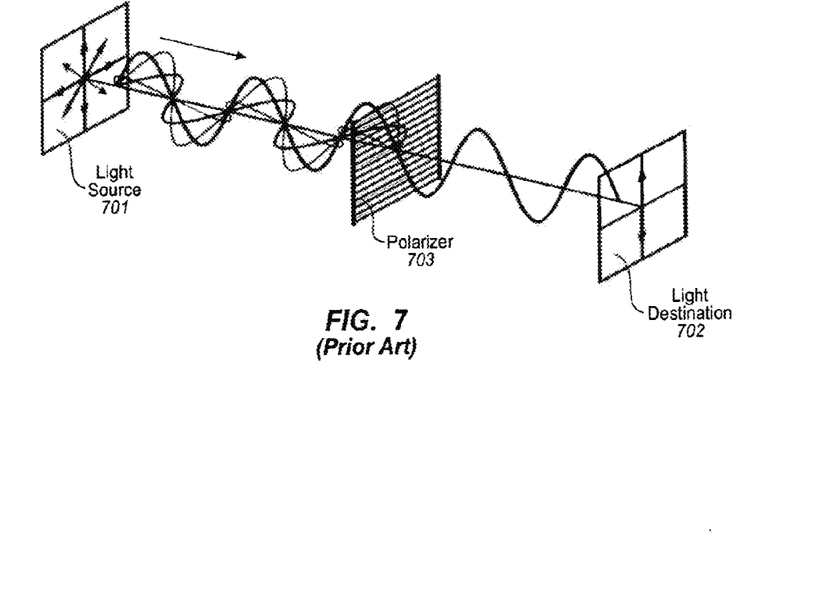
FIG. 7 illustrates an example of unpolarized light passing through a linear polarizer.

A polarizer is a device that filters unpolarized or mixed-polarization beam of electromagnetic waves (e.g., light) into a beam with a single polarization state (usually, a single linear polarization). For example, FIG. 7 depicts an example of a linear polarizer. As depicted in FIG. 2, an unpolarized or mixed-polarization beam 704 from light origination 701 is incident to the polarizer 703. Any portion beam 704 not having the polarization that polarizer 703 is configured to permit through is blocked (or filtered out). As such, a beam 705 having a single (and in this example linear) polarization is exigent from the polarizer 703 to light destination 702.

Accordingly, a polarizer essentially has a many to one effect, where light of many polarizations is filtered into light having a single polarization. The resulting energy of the polarized beam is reduced by the energy of blocked potions of the unpolarized or mixed-polarization beam. Accordingly, polarized reflection is not reciprocal, a property used in determining that unpolarized light is self-adjoint. That is, there is difficulty modeling the one to many relationship that a polarizer represents when tracing light back from the eye to the light source.

Figure 8:
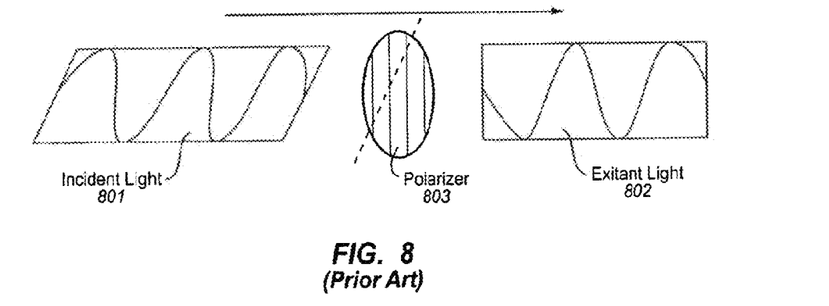
FIG. 8 illustrates an example of linear polarized light passing through a polarizer.

Additionally, when a bundle of linearly polarized photons passes through another polarizer or reflects off of a surface, the bundle retains a common (although different) polarization. For example, FIG. 8 depicts a bundle of linearly polarized photons interacting with a polarizer. As depicted in FIG. 8, incident light 801 light has a single polarization. Incident light 801 is incident upon polarizer or reflecting surface 803. The polarization of polarizer or reflecting surface 803 changes the polarization of incident light 801 to that of exitant light 802. Exitant light 802 has a single polarization (yet different than incident light 801). Exitant light 802 is then allowed to propagate through the environment.

Many surfaces, particles, air, and other substances cause polarization to occur in the real world. However, due at least part to the difficulty in representing polarization when tracing back light (the one to many difficulty), a limited of number of existing image rendering techniques even attempt to account for polarization.

These limited number of image rendering techniques that, at least to some extent, attempt to consider polarization, typically add polarization through the use of Jones matrices or Stokes vectors. However, the resulting systems are very complex because the entire path from light source to sensor (the forward path) must be known before computing the throughput to the sensor. Thus, many of these techniques that consider polarization are very resource intensive and/or have difficulty processing more complex images. Accordingly, these techniques have not been robust enough to be considered general rendering systems and have been limited to academic demonstrations.

One other system traces bundles of photons from the light with each bundle having a single polarization state (or multiple single polarization beams). However, such a formulation loses the ability to capture most phase effects, such as, for example, circular polarization.

BRIEF SUMMARY

The present invention extends to methods, systems, and computer program products for representing polarized light in computer models. A computer system includes a rendering pipeline configured to represent polarized light in rendered images that include a plurality of pixels. The rendered images including at least one light source emitting light energy into other portions of the image. In some embodiments, the computer system implements a method for calculating the light energy present at a specified view point within a renderable image.

The computer system accesses geometric primitive data representing a renderable image. Various portions of the geometric primitive data represent a light source emitting light energy into to other portions of the renderable image. Other various portions of the geometric primitive data represent surfaces having polarizing effects on light energy traveling within the image. A specified view point within the renderable image is designated where light energy is to be calculated. The computer system simulates a plurality of photon packets of different orientations that are to be transmitted in the adjoint direction from the specified view point back to the light source.

For each pixel in the renderable image the resulting energy from the light source present at the specified view point is calculated. The resulting energy is calculated from determining the light energy corresponding to each particle in each of the plurality of photon packets of different orientations.

For each particle, the computer system simulates transmission of the particle from the specified view point back to the light source. For each surface the particle intersects, a probability of the particle continuing to travel towards the light source after being incident upon the surface is calculated. The probability is calculated based on the orientation of the particle and the polarizing effect of the surface. It is randomly determined whether or not to propagate or terminate the particle based on the calculated probability. If it is determined to propagate the particle, the orientation of the particle is updated in accordance with the polarizing effect of the surface.

The light energy corresponding to the particle when it reaches the light source is added to the total energy present at the specified view point for the pixel, for any particles reaching the light source. The resulting light energy calculated for each pixel for particles that reached the light source is added together to calculate the total light energy present at the specific view point. The total light energy present at the specific view point can be forwarded to other components in the rendering pipeline to more accurately render the renderable image from the geometric primitive data (e.g., by representing polarized light).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for representing polarized light in computer models. A computer system includes a rendering pipeline configured to represent polarized light in rendered images that include a plurality of pixels. The rendered images including at least one light source emitting light energy into other portions of the image. In some embodiments, the computer system implements a method for calculating the light energy present at a specified view point within a renderable image.

The computer system accesses geometric primitive data representing a renderable image. Various portions of the geometric primitive data represent a light source emitting light energy into to other portions of the renderable image. Other various portions of the geometric primitive data represent surfaces having polarizing effects on light energy traveling within the image. A specified view point within the renderable image is designated where light energy is to be calculated. The computer system simulates a plurality of photon packets of different orentations that are to be transmitted in the adjoint direction from the specified view point back to the light source.

For each pixel in the renderable image the resulting energy from the light source present at the specified view point is calculated. The resulting energy is calculated from determining the light energy corresponding to each particle in each of the plurality of photon packets of different orientations.

For each particle, the computer system simulates transmission of the particle from the specified view point back to the light source. For each surface the particle intersects, a probability of the particle continuing to travel towards the light source after being incident upon the surface is calculated. The probability is calculated based on the orientation of the particle and the polarizing effect of the surface. It is randomly determined whether or not to propagate or terminate the particle based on the calculated probability. If it is determined to propagate the particle, the orientation of the particle is updated in accordance with the polarizing effect of the surface.

The light energy corresponding to the particle when it reaches the light source is added to the total energy present at the specified view point for the pixel, for any particles reaching the light source. The resulting light energy calculated for each pixel for particles that reached the light source is added together to calculate the total light energy present at the specific view point. The total light energy present at the specific view point can be forwarded to other components in the rendering pipeline to more accurately render the renderable image from the geometric primitive data (e.g., by representing polarized light).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the present invention can be used to trace back the total energy of polarized light to a light source such that the total energy can then be used to render an image. That is, a computer system can implement algorithms for calculating the total energy of polarized light for a portion of an image and use the calculated total energy of the polarized light to more accurately render the image.

Figure 3:
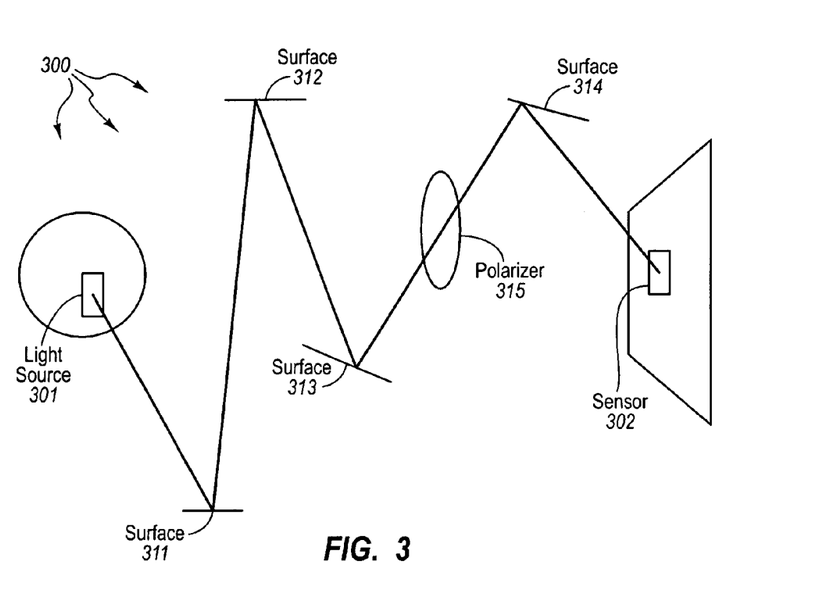
FIG. 3 illustrate an example light path between a light source and a sensor including a number of polarizers.

When rendering an image, a computer system can encounter polarized light incident upon a portion of geometry that is to be rendered. Before reaching the portion of geometry, the polarized light may have traveled through or reflected off of one or more polarizers (e.g., surfaces, particles, or other substances). For example, FIG. 3 illustrates an example light path 300 between a light source and a sensor including a number of polarizers. FIG. 3 depicts light (e.g., a collection of unpolarized photons) originating at light source 301, reflecting off of a number of surfaces 311, 312, 313, and 314 (that have some polarizing effect) and passing through polarizer 315, before reaching sensor 302.

Figure 4:
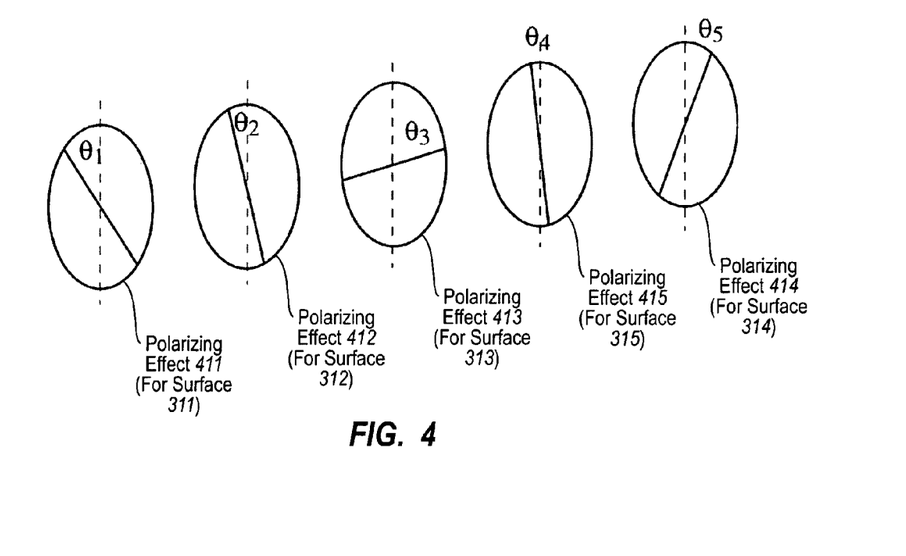
FIG. 4 illustrates an example of corresponding polarizing effects applied by a number of polarizers in the light path of FIG. 3.

FIG. 4 illustrates an example of corresponding polarizing effects applied by a number of polarizers in the light path of FIG. 3. Applied polarizing effects including: polarizing effect 411 for surface 311, polarizing effect 412 for surface 312, polarizing effect 412 for surface 313, polarizing effect 415 for polarizer 315 and polarizing effect 414 for surface 314.

Thus, for a particular bundle of linearly polarized light carrying energy E, the attenuation can be determined by a series of rotations into a corresponding polarizer's frame of reference as depicted in Equation 1:

$$\begin{bmatrix} o_u \\ o_v \end{bmatrix} = R(-\theta_5)S(1,0)R(\theta_5)S(1,0)$$

$$R(\theta_4)S(1,0)R(\theta_s)S(1,0)R(\theta_2)S(1,0)R(\theta_1)\begin{bmatrix} i_u \\ 0 \end{bmatrix}$$

Equation 1

The equation is in the native coordinate system of the initial photon. The matrices R are rotations and matrices S are scaling matrices in the u and v axes. In Equation 1, i indicates coordinates of input and o indicates a vector in local (u, v) coordinates. The product of all those R and S matrices ends up as a composite 2 by 2 matrix. When many photon packets are sent at different orientations, the average energy throughput can be determined from the singular values of that matrix, which are not necessarily affected by the initial or final rotations. Accordingly, if a photon is sent in reverse through the system (i.e., from sensor 302 to light source 310), the corresponding matrix is depicted as matrix 1, $$R(-\theta_1)S(1,0)R(-\theta_2)S(1,0)R(-\theta_3)S(1,0)R(-\theta_4)S(1,0)$$
$$R(-\theta_5)S(1,0)R(\theta_5)$$

Matrix 1

Matrix 1 in fact has the same singular values as the matrix of Equation 1 since for any matrices A and B the transpose properties depicted in Equation 2 hold true:

$$(AB)^T = B^T A^T$$

Equation 2

Further, since R(−Θ) is the transpose of R(Θ), and any scaling matrix is the transpose of itself.

Similarly, the same holds for polarized reflections. Consider a collection of unpolarized photons going along the light path 300 in FIG. 3. If no energy attenuation occurs at any intersection (so reflectance/transmittance of 1.0). Because unpolarized light transport is self-adjoint, the throughput is the same in either direction. For linearly randomly polarized light, there will be attenuation that depends on polarization at each intersection. This attenuation can be different for each of the two orthogonal components in the local coordinate system of the interaction. For a given polarization orientation, the orientation is first rotated into the local coordinate system of the interaction, and then scaled. Accordingly, an outgoing vector describing the amplitude of light in that local coordinate system is depicted in equation 3, in which i indicates coordinates of input in local (u, v) coordinates, o indicates a vector in local (u, v) coordinates, s indicates a singular value vector in local (u, v) coordinates, and a indicates a rotation sine/cosine vector in local (u, v) coordinates:

$$\begin{bmatrix} o_u \\ o_v \end{bmatrix} = \begin{bmatrix} s_u & 0 \\ 0 & s_v \end{bmatrix}\begin{bmatrix} a_u & a_v \\ -a_v & a_u \end{bmatrix}\begin{bmatrix} i_u \\ i_v \end{bmatrix}$$

Equation 3

For the entire chain of N interactions the two square matrices are replaced with a chain of N scales and N−1 rotations (the first can be dropped by representing initial energy on the coordinate system of the first interaction). This yields the overall matrix M as depicted in equation 4:

$$M = S_1 R_1 S_2 R_2 S_3 \ldots S_{N-1} R_{N-1} S_N$$

Equation 4

Thus, the total throughput is entirely a function of the singular values of M. If we send photons in reverse, the transform matrix N is depicted in Equation 5:

$$N = S_N R_{N-1}^{-1} S_{N-1} R_{N-2}^{-1} \ldots S_2 R_1^{-1} S_1$$

Equation 5

Because the scaling matrices are diagonal they are their own transpose, and the rotation matrices' inverses are their transposes, $N = M^T$. Thus N has the same singular values as M and thus the same throughput. So we can send photons from detector to light even when linear polarization is to be accounted for. As such, linearly polarized light can be traced in reverse (sensor to light) for any application that needs to account for sensors measuring light.

Algorithms for implementing the described matrices and equations can be included in a rendering pipeline that generates a two dimensional image from a model data describing three dimensional objects. The model data can describe three dimensional objects using a defined language and/or data structures containing, for example, geometry, texture, viewpoints, lighting, and shading information. Rendering is used in a variety of applications including but not limited to computer graphics, optical design, heat transfer, architecture, and lighting design.

Figure 1:
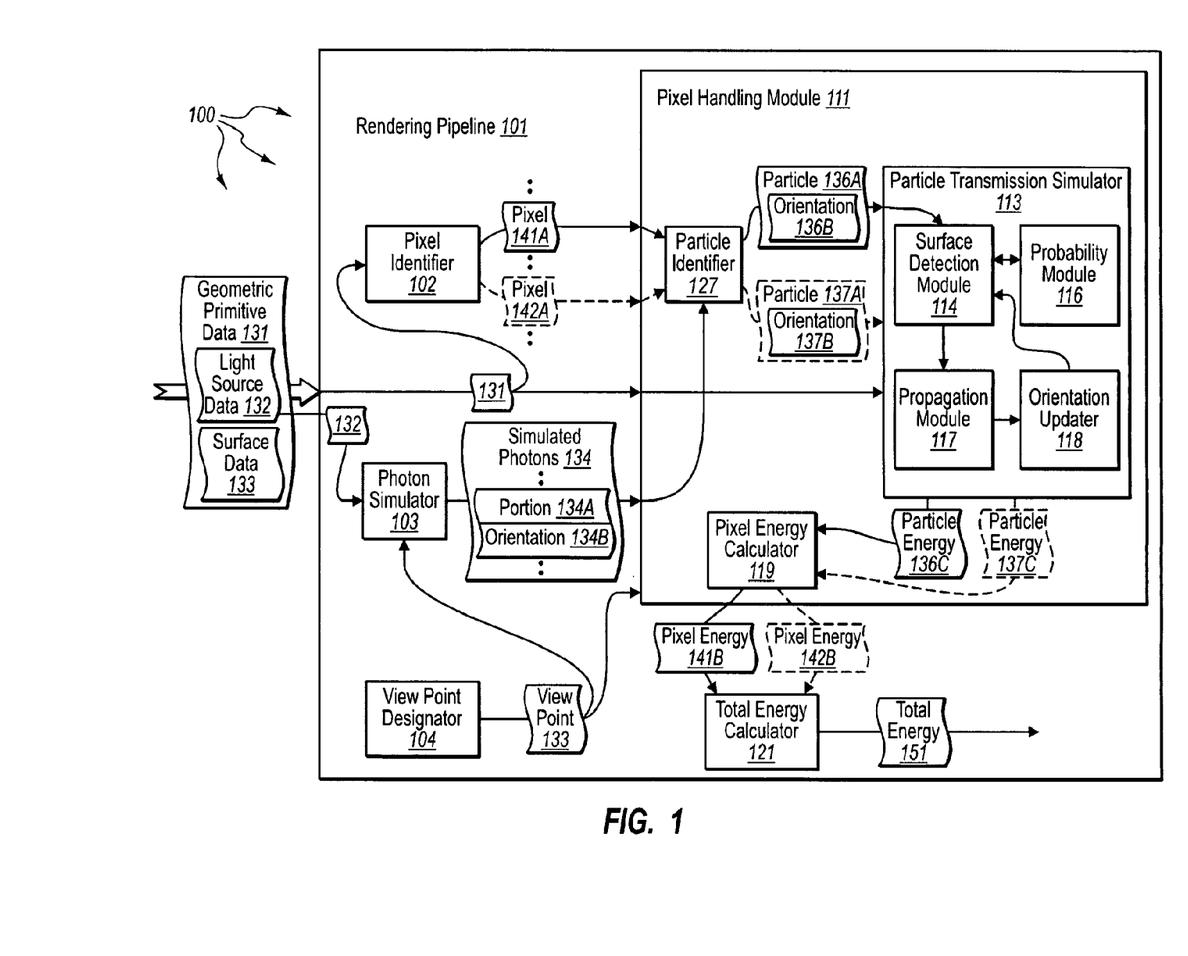
FIG. 1 illustrates an example computer architecture that facilitates representing polarized light in computer models.

FIG. 1 illustrates an example computer architecture 100, including rendering pipeline 101, that facilitates representing polarized light in computer models. Rendering pipeline 101 includes various rendering related modules including pixel identifier 102, photon simulator 103, pixel handling module 111, and total energy calculator 121. Pixel handling module 111 further includes particle identifier 127, particle transmission simulator 113 (along with subcomponents 114, 116, 117, and 118) and pixel energy calculator 119. Although not expressly depicted, rendering pipeline 101 can also include other rendering related modules that process model data before and/or after the expressly depicted modules of rendering pipeline 101. These other rendering related modules can include, for example, one or more of rasterization modules, scan line rendering modules, wireframe modules, ray casting modules, radiosity modules, volume rendering modules, Z-buffer modules, painter's algorithm modules, and ray tracing modules. Other optimization, sampling, caching, and filtering modules can also be included in rendering pipeline 101. The expressly depicted modules of rendering pipeline 101 can interoperate with these other modules to rendering two dimensional images from three dimensional model data.

Each of the depicted modules, as well as any other included modules, can be connected to one another over (or be part of) a network, such as, for example, a Local Area Network ("LAN"), a Wide Area Network ("WAN"), and even the Internet. Accordingly, each of the depicted modules as well as any other connected modules, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, pixel identifier 102 is configured to receive model data (e.g., geometric primitive data 131), identify a pixel of the resultant image, and output the identified pixel. View point designator 104 is configured to receive either user-entered or automated input indicating a view point within the resultant image. Alternately, a view point can be specified in received model data. View point designator 104 outputs the designated view point.

Photon simulator 103 is configured to receive light source data and a designated view point (e.g., either from view point designator 104 or included in received light source data). The received light source data can indicate a light source within the resultant image. Based on the light source data and designated view point, photon simulator 103 outputs simulated photos of different orientations to simulate light transmission from the designated view point back to the light source (i.e., in the adjoint direction).

Pixel handling module 111 is generally configured to calculate the resulting light energy present at the designated view point for each pixel. As previously described, the resulting energy can be calculated from determining the light energy corresponding to each particle in each of the plurality of photon packets of different orientations. Thus, within pixel handling module 111, particle identifier 127 is configured to receive an identified pixel and simulated photons. Particle identifier 127 identifies particles and corresponding orientations for any simulated photon that provides energy back to the designated view point at (i.e., passes through) the identified pixel. Particle identifier 127 outputs the particle and corresponding orientation.

Particle transmission simulator 113 is configured to receive a particle and orientation and model data. Based on the particle and orientation and model data. particle transmission simulator 113 simulates transmission of the particle from the designated view point back to the light source. Transmission of the particle can include the particle intersecting with one of more surfaces in the resultant image. Based on the particle and orientation and model data, surface detection module 114 is configured to determine when a particle intersects a surface within the resultant image. Based on the orientation of the particle and the polarization of the surface, that is some probability that the intersecting particle continues to be propagated (i.e., reflects or passes through the surface) and some probability that the particle stops propagating (i.e., filters out the particle). Probability module 116 is configured to calculate (based on particle and corresponding orientation and model data) and output either or both of these probabilities.

Propagation module 117 is configured to receive either or both of probabilities that a particle continues to propagate or that propagation is stopped for a particle. Based on either or both probabilities, propagation module 117 can randomly determine whether or not to propagate or terminate the particle. For example, propagation module 117 can generate a random number between zero and one and determine if the number falls within the received probability to terminate or propagate a particle.

If it is determined to propagate the particle, orientation updater 118 is configured to update the orientation of the particle in accordance with the polarizing effect of the surface. Orientation updater 118 can send the updated orientation of the particle back to surface detection module 114. Simulating transmission then continues with the new orientation. Simulated transmission can continue until the particle reaches the light source or is terminated upon intersecting a surface.

For each particle that reaches the light source, pixel handling module 111 calculates the particle energy of the particle when it reaches the light source. Pixel energy calculator 119 can accumulate and sum particle energies for any particles at the pixel into a pixel energy. Pixel energy calculator 119 can output the pixel energy. The pixel energy represents the energy present at the designated view point provided from the pixel.

Total energy calculator 121 can receive pixel energy values. Total energy calculator 121 can accumulate and sum pixel energies for each pixel in the resultant image into a total energy. Total energy calculator 121 forwarded the total energy to other components in rendering pipeline 101 to more accurately render the resultant image from model data (e.g., by representing polarized light). The total energy represents the amount of energy present at the designated view point provided from all pixels.

FIG. 2 illustrates a flow chart of an example method for representing polarized light in computer models. Method 200 will be described with respect to the components and data in computer architecture 100.

Method 200 includes an act of accessing geometric primitive data representing a renderable image (act 201). Various portions of the geometric primitive data represent a light source emitting light energy into to other portions of the renderable image. Various other portions of the geometric primitive data represent surfaces having polarizing effects on light energy traveling within the image. For example, rendering pipeline 101 can access geometric primitive data 131, including light source data 132 and surface data 133. Geometric primitive data 131 can include triangles, spline patches, points, polygons, lines, line segments, planes, circles, ellipses, spline curves, spheres, cubes, boxes, toroids, cylinders, pyramids, etc. As depicted, geometric primitive data. Geometric data 131 can be a portion of three dimensional model data that is to be used to render a two dimensional image.

Method 200 includes an act of designating a specified view point within the renderable image where light energy is to be calculated (act 202). For example, view point designator 104 can designate view point 133. Alternately, the designated view point can be included in model data received at rendering pipeline 101.

Method 200 includes an act of simulating a plurality of photon packets of different orientations that are to be transmitted in the adjoint direction from the specified view point back to the light source (act 203). For example, photo simulator 103 can receive light source data 132 and view point 133. Based on light source data 132 and view point 133, photon simulator 103 can generate simulated photons 134. Simulated photons 134 can include data representing one or more simulated photons and corresponding orientation, such as, for example, photon 134A/orientation 134B, for simulated transmission from view point 133 back to the light source. The orientations of simulated photons can be varied to have different values.

As depicted, pixel identifier 102 can receive geometric data 131. Pixel identifier 102 can identify each pixel represented within geometric data 131, such as, for example, pixel 141A, pixel 142A, etc. Pixel identifier 102 can send identified pixels to pixel handling model 111 to for energy calculations.

Thus, for each pixel of the renderable image, method 200 includes an act of calculating the resulting energy from the light source present at the specified view point (act 204). The resulting energy is calculated from determining the light energy corresponding to each particle in each of the plurality of photon packets of different orientations. For example, pixel handling module 111 can calculate the resulting energy for each pixel represented in geometric primitive data 131, including pixels 141A, 142A, etc. Pixel handling module 111 can calculate the resulting energy for a pixel from determining the light energy corresponding to each particle in each of the plurality of simulated photons 134 based on orientations.

As depicted, particle identifier 127 can receive an identified pixel, such as, for example, pixel 141A, and simulated photons 134. Particle identifier 127 can identify each particle and corresponding orientation, such as, for example, particle 136A/orientation 136B and particle 176A/orientation 176B, from simulated photons 134 that provides energy at the identified pixel, such as, for example, pixel 141A. Particle identifier 127 can send identified particles to particle transmission simulator 113 for simulated transmission.

As such, for each particle, method 200 includes an act of simulating transmission of the particle from the specified view point back to the light source (act 205). For example, transmission simulator 113 can simulate the transmission of particle 136A from view point 133 back to the light source. During simulated transmission of a particle, the particle can intersect with one or more surfaces represented in surface data 133.

Accordingly, for each surface the particle intersects, method 200 includes an act of calculating a probability of the particle continuing to travel towards the light source after being incident upon the surface, based on the orientation of the particle and the polarizing effect of the surface (act 206). For example, surface detection module 114 can detect when particle 136A intersects with a surface. Upon detecting the intersection, probability module 116 can calculate a probability of particle 136A continuing to propagate towards the light source based on orientation 136B. For example, orientation 136B can be compared to the polarization of the intersected surface to determine the probability of particle 136A reflecting off of and/or passing through the intersected surface.

For each surface the particle intersects, method 200 includes an act of randomly determining whether or not to propagate or terminate the particle based on the calculated probability (act 207). For example, propagation module 117 can randomly determine whether or not to propagate particle 136A based on the calculated probability of particle 136A continuing to propagate towards the light source. For each surface the particle intersects, method 200 includes an act of if it is determined to propagate the particle, updating the orientation of the particle in accordance with the polarizing effect of the surface (act 208). For example, if propagation module 117 propagates particle 136A, orientation updater 118 can update orientation 136B in accordance of with the polarizing effect of the intersected surface.

Based on the updated orientation 136B, acts 206, 207, and 208 are repeated. Acts 206, 207, 208 can be repeated until particle 136A propagates back the light source or is terminated. After transmission of particle 136A is simulated, the transmission of any other particles at the pixel, such as, for example, particle 137A/orientation 137B, can be similarly simulated. Accordingly, at least some particles at a pixel propagate back to the light source and at least some particles at a pixel are terminated.

For each pixel, method 200 includes an act of adding the light energy corresponding to the particle when it reaches the light source to the total energy present at the specified view point for the pixel, for any particle reaches the light source (act 209). For example, for pixel 141A, if particle 136A reaches the light source, pixel handling module 111 can determine particle 136A has particle energy 136C when it reaches the light source. Pixel handling module 111 can send particle energy 136C to pixel energy calculator 119.

Pixel energy calculator 119 can accumulate and sum the particle energies for any particles at pixel 141A. For example, it may be that particle 137A also reaches the light source. As such, pixel handling module 111 can determine particle 137A has particle energy 137C when it reaches the light source. Pixel handling module 111 can send particle energy 136C to pixel energy calculator 119. Pixel energy calculator 119 can add the sum of particle energies 136C and 137C to particle energies form any other particles at pixel 141A that reach the light source. The sum of all particle energies is pixel energy 141B (i.e., the total energy present at view point 133 for pixel 141A).

Method 200 includes an act of adding the resulting light energy calculated for each pixel for particles that reached the light source together to calculate the total light energy present at the specific view point (act 210). For example, pixel energy calculator can send pixel energy 141B to total energy calculator 121. Total energy calculator 121 can accumulate and sum the pixel energies for each pixel of the renderable image.

Acts 204, 205, and 209 can be repeated for any other pixels that pixel identifier 102 identifies. Acts 206, 207, and 208 can be repeated as appropriate for each identified particle of each of the other identified pixels. Accordingly, for each pixel of the renderable image, a pixel energy can be calculated. For example, pixel energy 142B can be calculated for pixel 142A. Pixel energy 142B represents the total energy present at view point 133 for pixel 142A.

Total energy calculator 121 can add the sum of pixel energies 141B and 142B to pixel energies for all the other pixels of the renderable image represented in geometric primitive data 131. The sum of all pixel energies is total energy 151 (i.e., the total energy present at view point 133 for the renderable image).

Method 200 can include a further act of forwarding the total light energy present at the specific view point to other components in the rendering pipeline to more accurately render the renderable image from the geometric primitive data. For example, total energy calculator 121 can forward total energy 151 to one or more other rendering related modules (including those previously described), optimization modules, sampling modules, caching modules, and filtering modules included in rendering pipeline 101. Based on total energy 151, a more accurate rendering of the image represented in geometric primitive data 131 can be obtained. For example, polarized light can be more accurately represented in the image.

Figure 5:
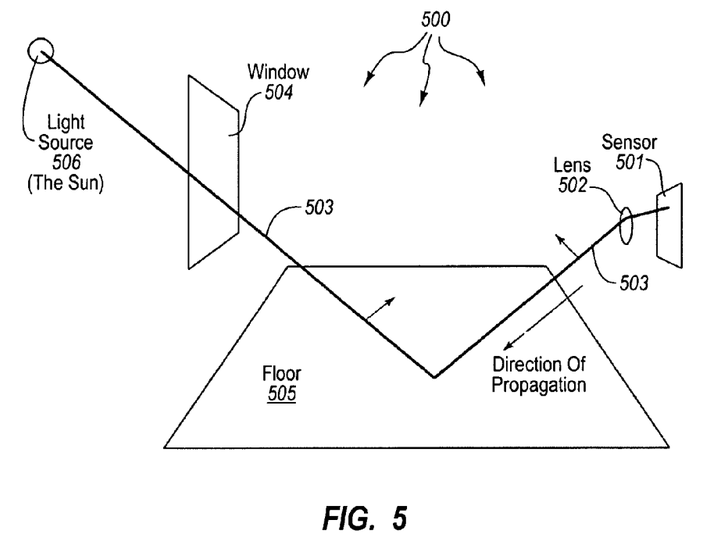
FIG. 5 illustrates an example of a rendered computer model.

As previously described, rendering is used in a variety of applications including but not limited to computer graphics, optical design, heat transfer, architecture, and lighting design. FIG. 5 illustrates an example of a rendered image 500 based on a computer model.

Image 500 represents, for example, a hotel lobby. To facilitate design of the lobby, an architect or designer can use a computer system including computer-readable media having stored thereon computer-executable instructions that, when executed at a processor of the computer system, cause the computer system to execute functionality described with respect to FIGS. 1, 2, 3, and 4. The computer-executable instructions can be included in and/or configured to interoperate with an image rendering pipeline that receives geometric primitives representing an image and from the received geometric primitives renders an image.

Accordingly, data for rendering the hotel lobby may be a virtual three dimensional geometric model composed of primitives, such as, for example, triangles and spline patches. Each surface (e.g., floor 505) represent in the model also has an associated material (e.g., granite or painted concrete) that introduces some polarization. The designer picks a viewpoint, for example, the hotel entrance (sensor 501), and places a virtual camera (lens 502) there. He or she wishes to know whether there will be too much glare from the floor at a typical check-in time (which determines the relative position of the Sun).

An accurate image can be created by sending photon-like particles from the camera (lens 502), and seeing what fraction of them hit light source 506 (the Sun). When sending a plurality of photon packets at different orientations, each particle (such as particle 503) has an orientation analogous to roll in an airplane. When particle 503 hits floor 505, the equations of reflection are evaluated and the probability of the particle reflecting for that roll and wavelength are computed.

Particle 503 is then randomly terminated or reflected based on that probability, and its roll angle is updated (e.g., a new polarized orientation) to be appropriate for the geometric properties of the interaction. Similarly, at the window interfaces (both the inside interface and outside) of window 504, the equations of reflection versus refraction are again computed, and a decision is made randomly to either reflect or refract. Again, the polarization is updated.

If the particle reaches light source 506 (the Sun), then the reading for the sensor element that generated the particle (e.g., lens 602) is updated. This is repeated for each particle in each of the plurality of photon packets and for each pixel. When the image subsequently rendered, the designer or architecture can visually examine the resulting image to determine whether the resulting glare from the floor is too much, acceptable, or too little (in which case the floor may not look polished enough). Similarly the designer can make usability decisions (e.g., is there enough light to read), aesthetic decisions (e.g., are the contrasts too high?) and then make changes to the hotel design and run the program again. For example, the architect or designer can change the composition of floor 505 and render the image again to determine if the new composition results in more appropriate (e.g., more or less) glare.

Accordingly, calculating the total energy of light in the adjoint direction (from sensor to light source) can be used to determine the total energy of light from light source to sensor, since across a plurality of photon bundles of varied orientations these two values can be essentially the same.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a rendering pipeline configured to represent polarized light in rendered images that include a plurality of pixels, the rendered images including at least one light source emitting light energy into other portions of the image, a method for calculating the light energy present at a specified view point within a renderable image, the method comprising:
   an act of accessing geometric primitive data representing a three-dimensional model, one or more first portions of the geometric primitive data representing a light source emitting light energy into the three-dimensional model and one or more second portions of the geometric primitive data representing surfaces within the three-dimensional model having polarizing effects on the light energy traveling within the three-dimensional model;
   an act of designating a specified view point within the renderable image where light energy is to be calculated;
   an act of simulating a plurality of photon packets that are to be transmitted in the adjoint direction from the specified view point back to the light source, each photon packet having a corresponding different particular orientation;
   for each pixel of the renderable image, calculating the resulting energy from the light source present at the specified view point, the resulting energy calculated from determining the light energy corresponding to each particle in each of the plurality of photon packets, including:
   for each particle:
      an act of simulating transmission of the particle from the specified view point back to the light source; and
      for each surface the particle intersects:
         calculating a probability of the particle continuing to travel towards the light source after being incident upon the surface, based on the corresponding particular orientation of the particle and based on the polarizing effect of the surface;
         randomly determining whether or not to propagate or terminate the particle, based on the calculated probability; and
         when it is determined to propagate the particle, updating the corresponding particular orientation of the particle in accordance with the polarizing effect of the surface; and
   an act of adding the light energy corresponding to the particle when it reaches the light source to the total energy present at the specified view point for the pixel, for any particle that reaches the light source; and
   an act of adding the resulting light energy calculated for each pixel for particles that reached the light source together to calculate the total light energy present at the specific view point.

2. The method as recited in claim 1, wherein the act of accessing geometric primitive data comprises accessing geometric primitive data that includes one or more of triangles, spline patches, points, polygons, lines, line segments, planes, circles, ellipses, spline curves, spheres, cubes, boxes, toroids, cylinders, and pyramids.

3. The method as recited in claim 1, wherein the act of designating a specified view point within the renderable image where light energy is to be calculated comprises an act of receiving user input designating the specified view point.

4. The method as recited in claim 1, wherein the act of designating a specified view point within the renderable image where light energy is to be calculated comprises an act of determining the specified view point from the received geometric primitive data.

5. The method as recited in claim 1, wherein the act of calculating a probability of the particle continuing to travel towards the light source after being incident upon the surface comprises an act of determining the probability that the polarization of the surface causes transmission of the particle to terminate due to the particle's corresponding particular orientation.

6. The method as recited in claim 1, wherein the act of calculating a probability of the particle continuing to travel towards the light source after being incident upon the surface comprises an act of calculating a probability of the particle reflecting off of the surface.

7. The method as recited in claim 1, wherein the act of calculating a probability of the particle continuing to travel towards the light source after being incident upon the surface comprises an act of calculating a probability of the particle passing through the surface.

8. The method as recited in claim 1, further comprising:
an act of forwarding the total light energy present at the specific view point to other components in the rendering pipeline to more accurately render the renderable image from the geometric primitive data.

9. The method as recited in claim 8, wherein the act of forwarding the total light energy present at the specific view point to other components in the rendering pipeline comprises forwarding the total light energy to one or more of a wireframe module, ray casting module, radiosity module, volume rendering module, Z-buffer module, painter's algorithm module, and ray tracing module.

10. The method as recited in claim 8, wherein the act of forwarding the total light energy present at the specific view point to other components in the rendering pipeline comprises forwarding the total light energy to one or more of an optimization module, sampling module, caching module, and filtering module.

11. A computer program product for use at a computer system, the computer system including a rendering pipeline configured to represent polarized light in rendered images that include a plurality of pixels, the rendered images including at least one light source emitting light energy into other portions of the image, the computer-program product for implementing a method for calculating the light energy present at a specified view point within a renderable image, the computer program product comprising one or more non-transitory computer-readable media having stored thereon computer-executable instructions that, when executed at a processor, cause the computer system to perform the method, including the following:
accessing geometric primitive data representing a three-dimensional model, one or more first portions of the geometric primitive data representing a light source emitting light energy into the three-dimensional model and one or more second portions of the geometric primitive data representing surfaces within the three-dimensional model having polarizing effects on the light energy traveling within the three-dimensional model;
designating a specified view point within the renderable image where light energy is to be calculated;
simulating a plurality of photon packets that are to be transmitted in the adjoint direction from the specified view point back to the light source, each photon packet having a corresponding different particular orientation;
for each pixel of the renderable image:
calculating the resulting energy from the light source present at the specified view point, the resulting energy calculated from determining the light energy corresponding to each particle in each of the plurality of photon packets, including:
for each particle:
simulating transmission of the particle from the specified view point back to the light source; and
for each surface the particle intersects:
calculating a probability of the particle continuing to travel towards the light source after being incident upon the surface, based on the corresponding particular orientation of the particle and based on the polarizing effect of the surface;
randomly determining whether or not to propagate or terminate the particle, based on the calculated probability; and
updating the corresponding particular orientation of the particle in accordance with the polarizing effect of the surface when it is determined to propagate the particle; and
adding the light energy corresponding to the particle when it reaches the light source to the total energy present at the specified view point for the pixel, for any particle that reaches the light source; and
adding the resulting light energy calculated for each pixel for particles that reached the light source together to calculate the total light energy present at the specific view point.

12. The computer program product as recited in claim 11, wherein computer-executable instructions that, when executed at a processor, cause the computer system to designate a specified view point within the renderable image where light energy is to be calculated comprise computer-executable instructions that, when executed at a processor, cause the computer system to determine the specified view point from the received geometric primitive data.

13. The computer program product as recited in claim 11, wherein computer-executable instructions that, when executed at a processor, cause the computer system to calculate a probability of the particle continuing to travel towards the light source after being incident upon the surface comprise computer-executable instructions that, when executed at a processor, cause the computer system to determine the probability that the polarization of the surface causes transmission of the particle to terminate due to the particle's corresponding particular orientation.

14. The computer program product as recited in claim 11, wherein computer-executable instructions that, when executed at a processor, cause the computer system to calculate a probability of the particle continuing to travel towards the light source after being incident upon the surface comprise computer-executable instructions that, when executed at a processor, cause the computer system to calculate a probability of the particle reflecting off of the surface.

15. The computer program product as recited in claim 11, wherein computer-executable instructions that, when executed at a processor, cause the computer system to calculate a probability of the particle continuing to travel towards the light source after being incident upon the surface comprise computer-executable instructions that, when executed at a processor, cause the computer system to calculate a probability of the particle passing through the surface.

16. The computer program product as recited in claim 11, further comprising computer-executable instructions that, when executed at a processor, cause the computer system to forward the total light energy present at the specific view point to other components in the rendering pipeline to more accurately render the renderable image from the geometric primitive data.

17. The computer program product as recited in claim 11, wherein the one or more computer-readable media comprise system memory.

18. The computer program product as recited in claim 11, wherein the one or more computer-readable media comprise a magnetic disk.

19. A computer system, the computer system comprising:
one or more processors;
system memory; and
one or more computer-readable media having stored thereon computer-executable instructions representing a rendering pipeline, the rendering pipeline configured to:
  access geometric primitive data representing a three-dimensional model, one or more first portions of the geometric primitive data representing a light source emitting light energy into the three-dimensional model and one or more second portions of the geometric primitive data representing surfaces within the three-dimensional model having polarizing effects on the light energy traveling within the three-dimensional model;
  designate a specified view point within the renderable image where light energy is to be calculated;
  simulate a plurality of photon packets that are to be transmitted in the adjoint direction from the specified view point back to the light source, each photon packet having a corresponding different particular orientation;
  for each pixel of the renderable image:
    calculate the resulting energy from the light source present at the specified view point, the resulting energy calculated from determining the light energy corresponding to each particle in each of the plurality of photon packets, including:
      for each particle:
        simulate transmission of the particle from the specified view point back to the light source; and
        for each surface the particle intersects:
          calculate a probability of the particle continuing to travel towards the light source after being incident upon the surface, based on the corresponding particular orientation of the particle and based on the polarizing effect of the surface;
          randomly determine whether or not to propagate or terminate the particle based on the calculated probability; and
          update the corresponding particular orientation of the particle in accordance with the polarizing effect of the surface when it is determined to propagate the particle; and
      add the light energy corresponding to the particle when it reaches the light source to the total energy present at the specified view point for the pixel, for any particle that reaches the light source; and
    add the resulting light energy calculated for each pixel for particles that reached the light source together to calculate the total light energy present at the specific view point.

* * * * *

UNITED STATES PATENT AND TRADEMARK OFFICE
CERTIFICATE OF CORRECTION

PATENT NO. : 8,711,145 B2  Page 1 of 1
APPLICATION NO. : 12/526019
DATED : April 29, 2014
INVENTOR(S) : Peter Schuyler Shirley et al.

It is certified that error appears in the above-identified patent and that said Letters Patent is hereby corrected as shown below:

In the specification,

Column 1

Line 11, Insert new paragraph with heading -- GOVERNMENT LICENSE RIGHTS - This invention was made with government support under CCF0306151 awarded by the National Science Foundation. The government has certain rights in the invention. --

Signed and Sealed this
Twenty-first Day of April, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,711,145 B2 |
| APPLICATION NO. | : 12/526019 |
| DATED | : April 29, 2014 |
| INVENTOR(S) | : Shirley et al. |

It is certified that error appears in the above-identified patent and that said Letters Patent is hereby corrected as shown below:

In the Specification,

Column 1
Line 45, change "various different weather conations" to --various different weather conditions--

Column 2
Line 65, change "reduced by the energy of blocked potions" to --reduced by the energy of blocked portions--

Column 5
Line 1, change "light traveling form a light source" to --light traveling from a light source--

Column 7
Line 27, change "polarizing effect 412" to --polarizing effect 413--

Column 7
Line 28, change "polarizer 315" to --surface 315--

Column 9
Line 51, change "one of more surfaces" to --one or more surfaces--

Column 10
Line 61, change "photo simulator 103" to --photon simulator 103--

Column 11
Line 63, change "in accordance of with" to --in accordance with--

Column 12
Line 25, change "particle energies form" to --particle energies from--

Signed and Sealed this
Seventh Day of July, 2015

Michelle K. Lee
*Director of the United States Patent and Trademark Office*